Nov. 15, 1927. 1,649,085

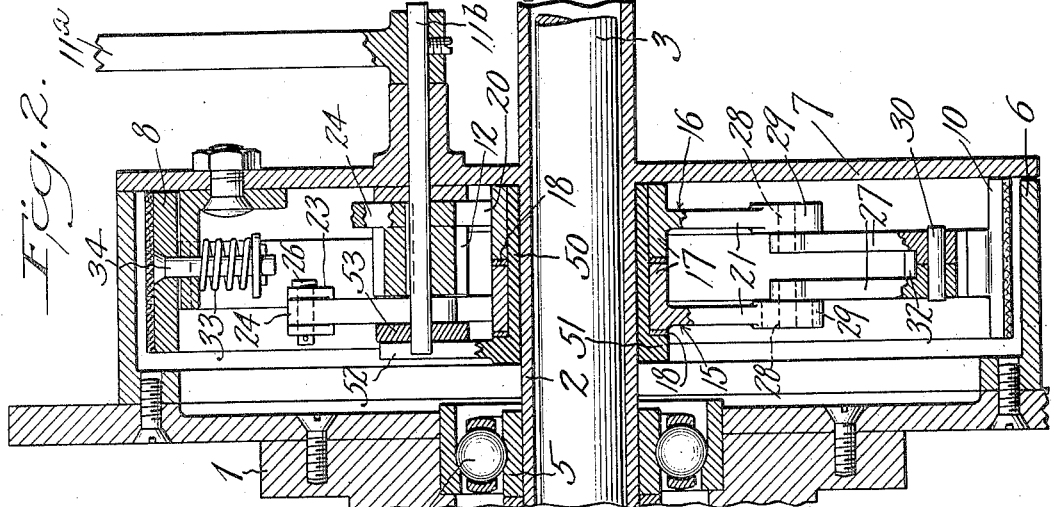
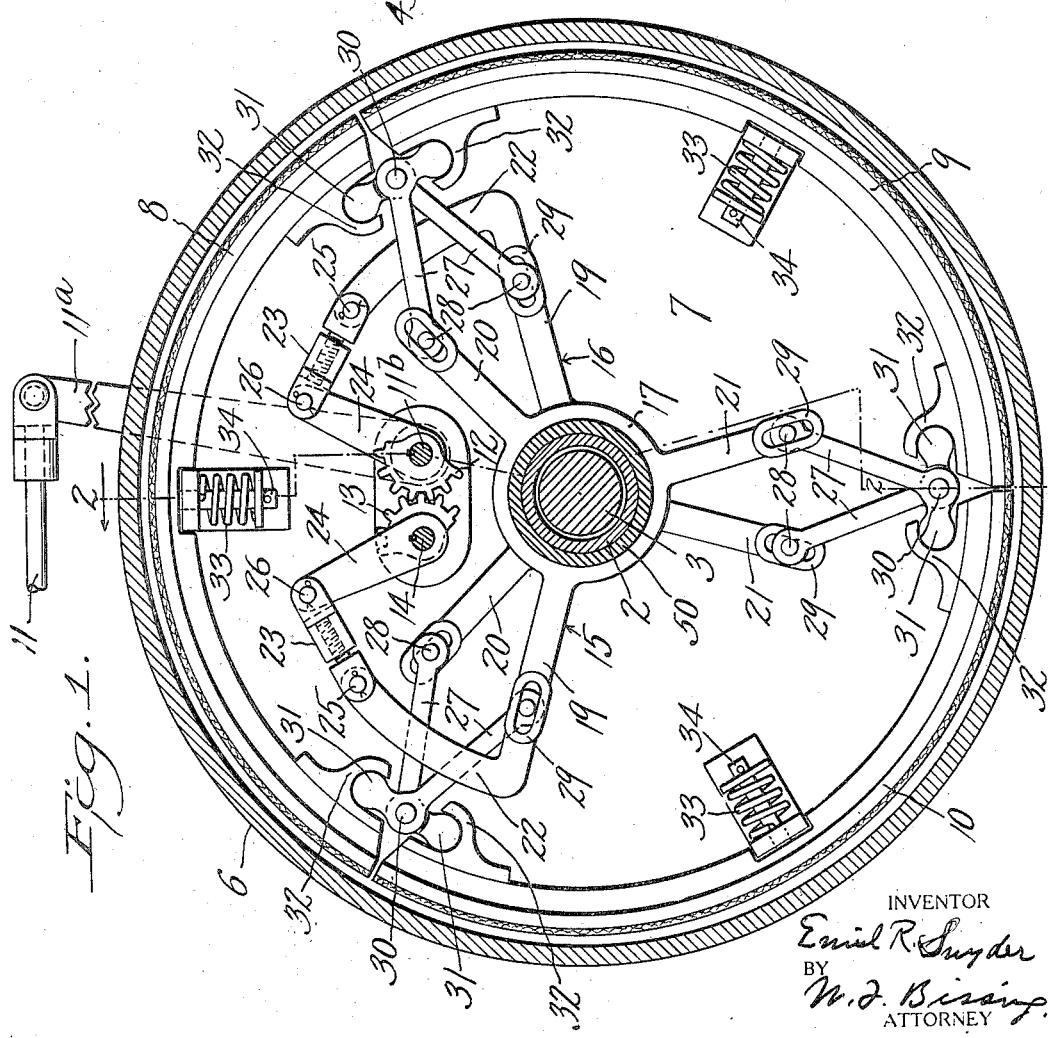

E. R. SNYDER

VEHICLE BRAKE

Filed Aug. 3, 1926 2 Sheets-Sheet 2

INVENTOR
Emil R. Snyder
BY
M. J. Bissing
ATTORNEY

Patented Nov. 15, 1927.

1,649,085

UNITED STATES PATENT OFFICE.

EMIL R. SNYDER, OF NEW YORK, N. Y.

VEHICLE BRAKE.

Application filed August 3, 1926. Serial No. 126,799.

My invention relates to a brake mechanism for vehicle wheels and more particularly to the type of brake mechanism known as the internal expanding brake.

One of the objects of my invention is to provide an internal expanding brake in which the full surfaces of the brake shoes are uniformly and evenly pressed against and frictionally engage the brake drum, and in which means are provided for preventing circumferential movement of the brake shoes, which are so constructed as to permit the brake shoes to closely adjoin each other and act on the entire periphery of the brake drum, thus obtaining uniform and equal braking power over a maximum braking surface.

Another object of the invention is to so arrange the parts within the brake drum, for operating the brake mechanism, that a large multiplication of leverage is obtained, ensuring maximum braking effort with minimum operating power.

Another object of the invention is to provide easily accessible and simplified means for adjusting the link mechanism, when the brake shoe linings are worn or replaced.

Another object of the invention is to so construct the parts that they are interchangeable so as to facilitate manufacture, assembly and replacement.

With the above and other objects in view, my invention consists in the parts, improvements and combinations more fully pointed out hereinafter.

Turning now to the drawings, which illustrate one embodiment of the invention:

Figure 1, is a vertical section of the brake mechanism, illustrating the parts in their normal or released position.

Figure 2, is a cross-sectional view of the brake on line 2—2 of Figure 1.

Figure 3:
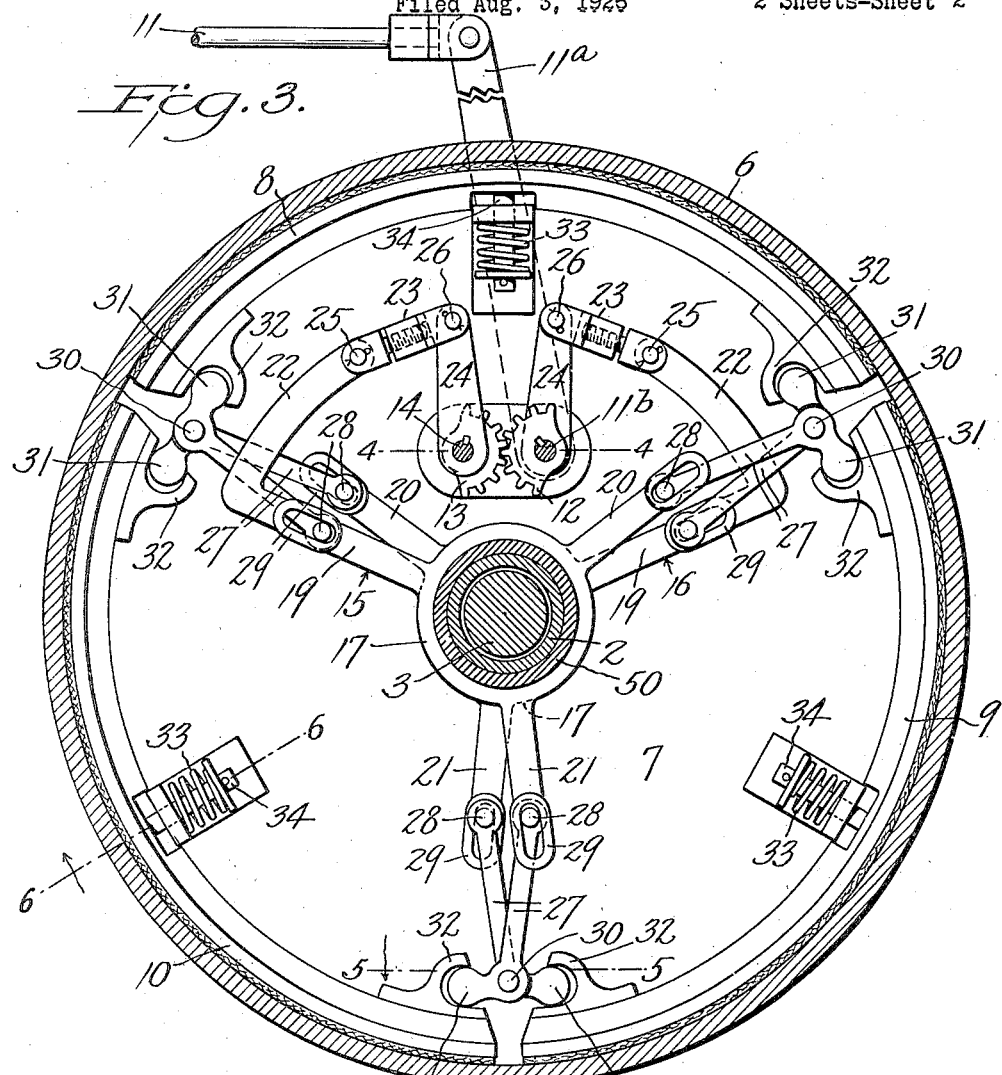
Figure 3, is a vertical section of the brake mechanism, illustrating the parts in their applied or braking position.
Figure 4:
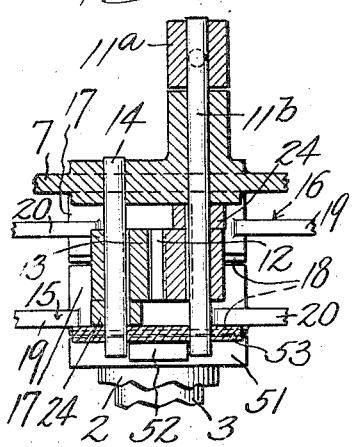
Figure 4, is a detailed cross sectional view on line 4—4 of Figure 3.
Figure 5:
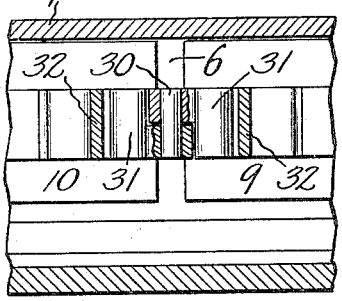
Figure 5, is a detailed cross sectional view on line 5—5 of Figure 3.
Figure 6:
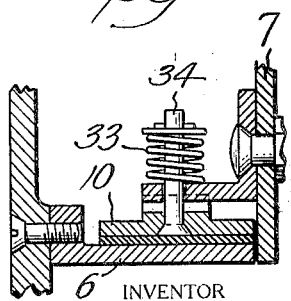
Figure 6, is a detailed horizontal view on line 6—6 of Figure 3.

In the drawings the hub 1 of a wheel (not shown), is illustrated mounted upon the fixed hollow housing 2, which receives the axle 3. In the form of the invention illustrated, the hub revolves on the housing upon bearings 4, in race 5, and carries an annular flange known as the brake drum 6. Fixedly mounted on the housing 2, is a back plate 7, for supporting the brake mechanism.

In the best embodiment of the invention, I provide three brake shoes 8, 9, 10, suitably lined, which closely adjoin each other and which are arranged to frictionally engage the entire periphery of the brake drum 6.

Means are provided for multiplying the leverage between the operating lever and the brake shoes. As shown, a brake rod 11, operated either by a hand or foot lever (not shown), is attached to an arm $11^a$, which is secured to a rod $11^b$, which passes thru a suitable opening provided in the back plate. In the preferred form of the invention, a gear 12, is secured to rod $11^b$. A second gear 13, carried by stub shaft 14, mounted on the back plate 7, meshes with gear 12.

As illustrated in Figures 1 and 3, a pair of coaxial, oppositely disposed sector members 15, 16, are provided. Each sector member is provided with a ring 17, which is centrally pivoted on a sleeve 50, carried by the housing 2. The sleeve 50, is provided at its outer end with an annular flange 51, carrying a vertical arm 52. Attached to the vertical arm 52, is a crosspiece 53, which receives the ends of stub shaft 14 and rod $11^b$, carrying the gears. The sleeve with its flange supports the sector members and holds them in position and the crosspiece carried by the sleeve firmly supports the ends of the stub shaft and rod. Suitable washers 18, are provided between the wings of the two sector members and between the flange of the sleeve and the adjoining sector member.

Each sector member, in the preferred form of the invention, is provided with three radial arms 19, 20, 21. The arm 19, of each sector member is of greater length than the other arms of the members, and is provided with an elbow branch 22.

Means are provided for permitting adjustment of the link mechanism, thus permitting adjustments of the throw of the brake shoe segments when the shoe linings are worn or replaced. Each of said elbow branches of the sector members is connected to its respective gear 12, 13, by a suitable adjustable link mechanism. In the form of the invention illustrated, this mechanism comprises a turnbuckle 23, which is pivoted to a link 24. Each turnbuckle 23, is connected at one end to its respective elbow branch 22, by a pin 25, which passes thru openings provided in each turnbuckle and elbow branch, and which may be held in place by an ordinary cotter pin. Each turnbuckle 23, at its other end is pivotally connected to one end of link 24, by pin 26, passing thru openings in each turnbuckle and link and which may also be held in place by a cotter pin. The other end of each link 24, is respectively keyed to stub shaft 14, and rod 11$^b$. By this adjusting means, the throw of the brake shoe segments can be adjusted when the brake linings are worn or replaced. When adjustment for worn linings is desired, the pin 26 is removed, the turnbuckle 23, is turned so as to shorten it and the pin 26, replaced. This results in an adjustment of the initial position of the sector members and an outward adjustment of the throw of the brake shoe segments. When the brake linings of the shoes are replaced, the pin 26 is removed, the turnbuckle 23, turned so as to lengthen it and the pin 26 replaced. This results in a repositioning of the initial position of the sector members and a consequent inward adjustment of the brake shoes. By thus adjusting the two turnbuckles, all three brake shoes are simultaneously adjusted.

Means are provided for multiplying the leverage and expanding the brake shoes when the sectors are rocked. In the form of the invention illustrated a plurality of pairs of bell cranks 27, are provided, two for each brake shoe segment. One bell crank of a pair is pivotally connected at one end to a radial arm of one sector member, and the other bell crank of the pair pivotally connected to a radial arm of the other sector member, by means of studs 28, which enter slots in the ovals 29, on each radial arm. Each pair of bell cranks is carried and rocked on a common pivot pin 30, and each terminates in a shoulder 31, which enters and engages a recessed flange 32, of neighboring brake shoe segments, each brake shoe segment, being provided at one extremity thereof with one of said recessed flanges. The pins 30, holding the bell cranks engaging recessed flanges 32, hold the brake shoe segments in position. They prevent circumferential movement of the brake shoes when these are forced out against the revolving brake drum.

The shoulders 31, engaging recessed flanges 32, also serve to hold the shoe segments firmly in place when they are in their normal or released position and prevent oscillation and rattling of the shoes.

Each pair of bell cranks is pivoted on a common pivot and engages adjoining brake shoes. One member of each pair is connected to one sector member and the other member of each pair is connected to the other sector member. By providing two coaxial sector members and simultaneously rocking them in opposite directions, all the bell cranks actuated by the respective sectors, simultaneously exert uniform, outward pressure on the brake shoes.

By providing the pin and slot connection between the sector arms and the bell cranks, which actuate the shoes, it is impossible to move the long bell crank arms past their dead center position, for the pins 30, will strike the inner faces of ovals 29, and prevent further motion of the bell crank arms, before the dead center position is reached. The pins and slots will, however, allow full motion of the bell cranks without reduction of braking pressure on the brake linings despite the wear on the brake linings and the complete wearing of the brake linings would not permit the bell cranks to pass their dead center position.

Springs 33, are provided for returning the shoe segments when the brake is released. As illustrated, these springs are preferably positioned midway of the shoe segments so as to avoid interference between them and the brake actuating mechanism. The springs, as shown, are carried by pins 34, on the brake shoe segments, and are connected, at one end, with the fixed back plate 7.

The construction of the parts of the above-described mechanism, i. e. the brake shoes, sector members, bell cranks, gears, etc., is such that the parts are interchangeable in their relative positions. This greatly facilitates manufacture, assembly and replacement.

Having thus described the construction of the mechanism, its operation will be clear. The actuation of brake rod 11, will rotate rod 11$^b$ and gear 12, mounted thereon; gear 13, meshing with gear 12, will, likewise, be simultaneously rotated. The link mechanism will thus be rocked by their respective gears, and cause the sector members to turn about the sleeve 50. This movement of the sector members will actuate bell cranks 27, pivotally connected to the radial arms of said sector members. Rocking of the bell crank shoulders 31, outwardly against the recessed flanges 32, and against each extremity of the brake shoe segments, expands the segments so that they will uniformly, frictionally engage the entire inner periphery of the brake drum. The shoulders 31 engaging recessed flanges 32, not only expand the brake shoe segments against the brake drum but also act to prevent circumferential movement of the brake shoes upon contact with the revolving brake drum, doing away with the usual fixed stops between the shoe segments. Upon release of the brake, the springs 33, return the shoe segments to their normal positions. It will be observed that the arrangement of the gearing, link mecha- nism, sector members and bell cranks, is such as to result in a large multiplication of leverage between the brake rod and the shoe segments upon application of the brake and that the bell cranks are so positioned with relation to the sector members that complete wearing of the brake linings would not permit the bell cranks to pass their dead center position with its consequent disadvantages.

Having thus described the invention and its operation, it will be understood that changes may be made in carrying the invention into effect, without departing from the principle thereof.

What I claim and desire to secure by Letters Patent is:

1. A brake mechanism comprising in combination, a brake drum, a plurality of segmental brake shoes, mounted within and arranged to engage the inner periphery of the drum, a pair of coaxial sector members, means for simultaneously operating said sector members in opposite directions, and a plurality of bell cranks connected to said sector members and engaging said brake shoe segments.

2. A brake mechanism comprising in combination, a brake drum, a plurality of segmental brake shoes, mounted within and arranged to engage the inner periphery of the drum, a plurality of pairs of bell cranks, each pair being mounted on a common pivot, the bell cranks of each pair engaging adjoining brake shoes, and means for rocking said bell cranks.

3. A brake mechanism comprising in combination, a brake drum, a plurality of segmental brake shoes mounted within and arranged to engage the inner periphery of the drum, a pair of coaxial sector members, means for simultaneously operating said sector members in opposite directions, and a plurality of bell cranks connected to said sector members and engaging said brake shoe segments, the brake shoe segments, sector members and bell cranks being interchangeable in their relative positions.

4. A brake mechanism comprising in combination, a brake drum, a plurality of segmental brake shoes, mounted within and arranged to engage the inner periphery of the brake drum, a pair of toothed members, means for rotating said toothed members, and a plurality of bell cranks, one end of each bell crank engaging one of said brake shoe segments, and means connecting the other ends of said bell cranks with the toothed members.

5. A brake mechanism comprising in combination, a brake drum, a plurality of adjoining, segmental brake shoes, arranged to engage the inner periphery of said drum, a pair of engaging gears, a brake rod for actuating one of said gears, a pair of sector members, means connecting said sector members with said gears, and a plurality of bell cranks, mounted within the brake drum, one end of each bell crank being pivotally connected to one of said sectors, the other end engaging an extremity of a brake shoe segment.

6. A brake mechanism comprising in combination, a brake drum, a plurality of segmental brake shoes arranged to engage the inner periphery of said drum, a pair of engaging gears, a brake rod for rotating one of said gears, a pair of sector members, means connecting each sector member with its respective gear, and a plurality of pairs of bell cranks, mounted with the brake drum, one of each pair of bell cranks being pivotally connected to one of said sector members and to one brake shoe segment, the other bell crank of each pair being pivotally connected to the other of said sector members and engaging the neighboring brake shoe segment.

7. A brake mechanism comprising in combination, a brake drum, a plurality of brake shoe segments mounted within said drum, a back plate for the brake mechanism, a pair of engaging gears, a brake rod for rotating one of said gears, a pair of sector members, means connecting each sector member with its respective gear, said sector members including a ring and a plurality of radial arms, and a plurality of bell cranks, one end of a bell crank being pivotally connected to each radial arm of the sector members, the other end of each bell crank engaging an extremity of a brake shoe segment.

8. A brake mechanism comprising in combination, a brake drum, a plurality of brake shoe segments mounted within said drum, a back plate for the brake mechanism, an axle housing, a sleeve mounted on the axle housing, a pair of engaging gears, a brake rod for rotating one of said gears, a pair of sector members, means for connecting each sector member with its respective gear, said sector members each provided with a ring mounted on said sleeve and a plurality of radial arms, and a plurality of bell cranks, one end pivotally connected to a radial arm of the respective sector members, the other end of each bell crank engaging an extremity of a brake shoe segment.

9. A brake mechanism comprising in combination, a brake drum, a plurality of brake shoe segments mounted within said drum, a back plate for the brake mechanism, a pair of engaging gears, a brake rod for rotating one of said gears, a stub shaft on which said other gear is mounted, an axle housing, a sleeve mounted on the axle housing, said sleeve provided with a flange, a vertical arm carried by said flange, a crosspiece mounted on said vertical arm for receiving the ends of the stub shaft and brake rod, a pair of sector members, means connecting each sector member with its respective gear, each of said sector members having a ring mounted on said sleeve, and a plurality of bell cranks, the bell cranks at one end being pivotally connected to the respective sector members, the other end of each bell crank engaging an extremity of a brake shoe segment.

10. A brake mechanism comprising in combination, a brake drum, a plurality of adjoining brake shoe segments mounted within said drum, a pair of engaging gears, a brake rod, a pair of sector members, each of said sector members having a centrally pivoted ring and a plurality of radial arms, one of the radial arms of each sector member being provided with an elbow branch, link mechanism connecting each of said elbow branches with its respective gear, and a plurality of bell cranks, two for each brake shoe segment, one end of each bell crank engaging an extremity of a brake shoe segment, the other end of each bell crank being pivotally connected to a radial arm of the respective sector members.

11. A brake mechanism comprising in combination, a brake drum, a plurality of adjoining brake shoe segments mounted within and arranged to engage the periphery of said drum, a pair of engaging gears, a brake rod, a pair of centrally pivoted sector members, each of said sector members being provided with a plurality of radial arms, adjustable link connections between each of said sector members and its respective gear and a plurality of bell cranks, two for each brake shoe segment, one end of each bell crank being pivotally connected to one of said radial arms, the other end of each bell crank engaging an extremity of a brake shoe segment.

12. A brake mechanism comprising in combination, a brake drum, a plurality of adjoining brake shoe segments mounted within and arranged to engage the inner periphery of said drum, a pair of engaging gears, a brake rod, a pair of centrally pivoted sector members, each of said sector members being provided with a plurality of radial arms, adjustable link connections between each of said sector members and its respective gear, and a plurality of pairs of bell cranks, one end of each bell crank of a pair being connected to one sector member, the other bell crank of the pair being connected to the other sector member, the other ends of each pair of bell cranks, engaging adjoining extremities of two brake shoe segments.

13. A brake mechanism comprising in combination, a brake drum, a plurality of brake shoe segments, mounted within said drum, a pair of engaging gears, a brake rod, a pair of centrally pivoted sector members, each of said sector members being provided with a plurality of radial arms, a turnbuckle connection between each of said sector members and its respective gear, and a plurality of bell cranks, two for each brake shoe segment, one end of each bell crank being connected to one of the radial arms of the sector members, said radial arms being provided with slots with which said bell crank arms engage, the other end of each bell crank engaging an extremity of a brake shoe segment.

14. A brake mechanism comprising in combination, a brake drum, a plurality of brake shoe segments mounted within said dum, a pair of recessed flanges mounted on the inner face of each shoe segment at each extremity thereof, a pair of engaging gears, a brake rod, a pair of centrally pivoted sector members, each of said sector members being provided with a plurality of radial arms, adjustable, pivotal connections between each sector member and its respective gear, and a plurality of bell cranks, each bell crank being pivotally connected at one end to one of said radial arms, and being provided at its other end with a shoulder, said shoulders entering and engaging said recessed flanges on the brake shoe extremities.

15. A brake mechanism comprising in combination, a brake drum, three adjoining brake shoe segments, mounted within and arranged to engage the inner periphery of said drum, a pair of recessed flanges mounted on the inner face of each brake shoe segment at each extremity thereof, a pair of engaging gears, a brake rod, a pair of oppositely disposed, centrally pivoted sector members, each sector member including three radial arms, one of said radial arms of each sector member being provided with an elbow branch, adjustable, pivotal connections between each of said elbow branches and its respective gear, and a plurality of pairs of bell cranks, one end of each bell crank of a pair being connected to one sector member, the other bell crank of the pair being connected to the other sector members, the other ends of each pair of bell cranks being provided with shoulders, said shoulders of each pair entering and engaging the recessed flanges on adjoining brake shoe extremities.

In testimony whereof, I have signed my name to this specification.

EMIL R. SNYDER.